United States Patent [19]
Jonsson

[11] 3,917,079
[45] Nov. 4, 1975

[54] DEVICE FOR OVERTURNING OF PRISMATIC BODIES

[75] Inventor: Bo Lennart Jonsson, Vastra Frolunda, Sweden

[73] Assignee: Centro-Maskin i Goteborg AB, Goteborg, Sweden

[22] Filed: Feb. 11, 1974

[21] Appl. No.: 441,226

[30] Foreign Application Priority Data
Feb. 15, 1973  Sweden................................ 7302115

[52] U.S. Cl..................... 214/1 QG; 51/236; 72/250
[51] Int. Cl.²......................................... B65G 7/00
[58] Field of Search................ 214/1 Q, 1 QG, 340; 51/236, 251; 72/250, 251

[56] References Cited
UNITED STATES PATENTS
| | | | |
|---|---|---|---|
| 2,575,302 | 11/1951 | Shaw............................. | 214/340 X |
| 3,157,071 | 11/1964 | Pachell.......................... | 214/1 QG |
| 3,724,682 | 4/1973 | Parris............................ | 214/1 QG |

FOREIGN PATENTS OR APPLICATIONS
| | | | |
|---|---|---|---|
| 1,277,123 | 9/1968 | Germany........................ | 214/1 QG |

Primary Examiner—Frank E. Werner
Attorney, Agent, or Firm—Ulle C. Linton

[57] ABSTRACT

A device for the overturning of polygonal bodies, by a plurality of pivotal elements preferably journalled on shafts located in a common horizontal plane and which elements have edges parallel to the diameters of said shafts and are turned the same direction in synchronization with the body to be overturned initially resting on one of said elements, then during pivoting of said elements, said body by its weight follows the pivoting movement of the edge of the other element against which the body rest while being supported by an edge of the other element in a notch provided between two edges of said elements when they are in an inclined position and finally, when the edge of the other element is turned to a horizontal position, said body rest on said other element after having been overturned an angle which corresponds to the division between two juxtapositioned sides of said body.

5 Claims, 7 Drawing Figures

DEVICE FOR OVERTURNING OF PRISMATIC BODIES

The present invention relates to a device for overturning of polygonal bodies.

It is an object of the present invention to provide a device for overturning of bodies of preferably square cross section, by way of example blooms and rolled billets, which because of their weight cannot be turned by hand. In this connection the aim has been to provide a device, which is especially suited to be placed directly in connection with a machine tool, for example a machine for rough-grinding of rolled billets.

Figure 1:
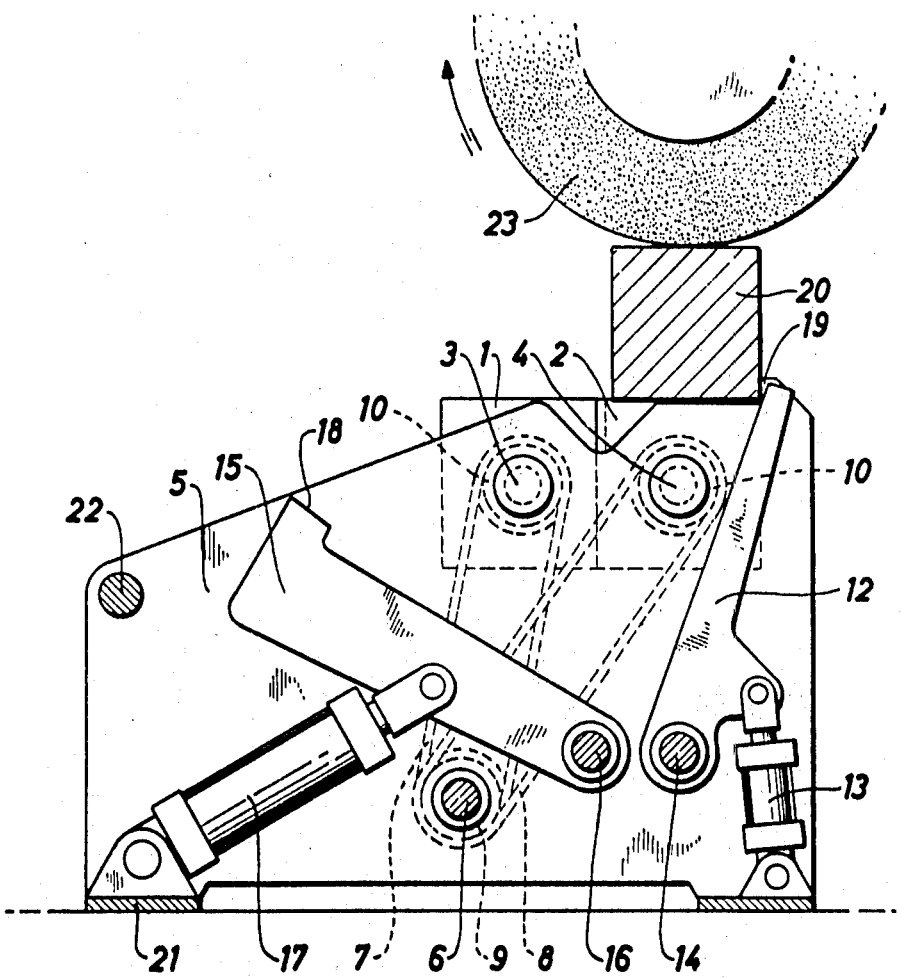
Figure 2:
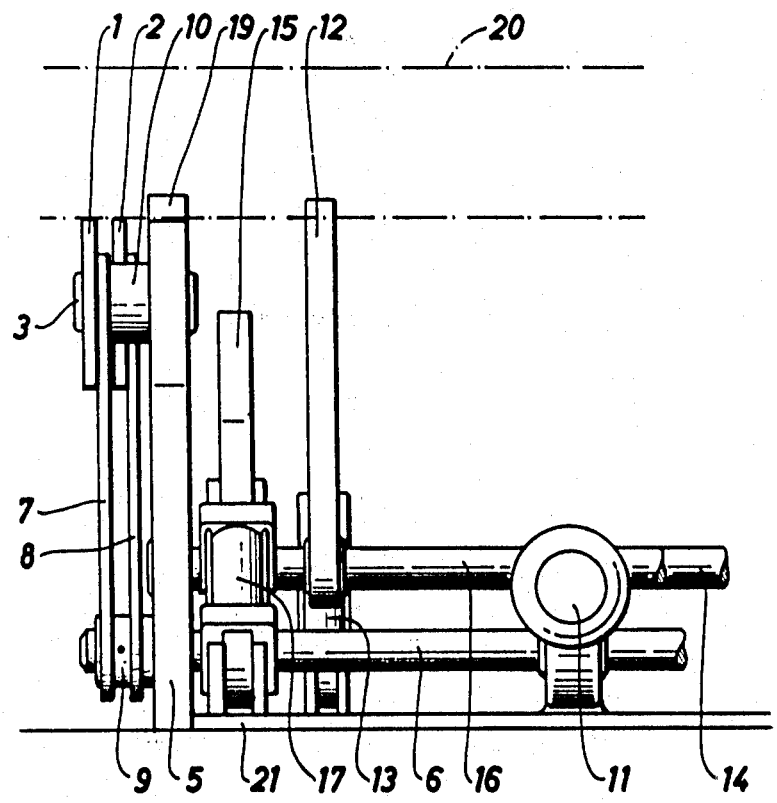

In the accompanying drawings an embodiment of the invention is illustrated and will be described below. In FIG. 1 an end portion of the machine is illustrated, as seen from its inside, while FIG. 2 shows the same end portion in a side elevational view, as seen at right angle to the view in FIG. 1. The FIGS. 3 - 7 schematically illustrate different phases of a working cycle for the machine, during which a square working piece is turned.

According to the invention the overturning device comprises two square plates 1, 2 pivotably journalled each one on its shaft 3, 4 which shafts are in a common horizontal plane. In the prolongation of the shafts 3, 4 there are further shafts, not shown, supporting square plates of the same kind as 1, 2. Suitably there are two pairs of plates 1, 2, each pair of plates being journalled on an end frame piece 5 of the turning device. Each plate 1, 2 thus is journalled on a shaft 3, 4 which is mounted on the end piece 5, on which in addition a driving shaft 6 is journalled equipped with a cogbelt pulley 9 arranged to drive two cogbelts 7, 8. The cogbelt pulley 9 by means of the cogbelts 7, 8 is connected with additional cogbelt pulleys 10, so that the plates 1, 2 can be driven from the driving shaft 6 in the same direction of rotation and in a synchronized movement. The driving shaft 6, which extends from one end frame piece to the other, is arranged to be driven by means of a down changed electric motor 11 (FIG. 2).

As is evident especially from FIG. 1 there are for one part an arm 12 journalled on the inside of the end frame pieces, which arm by means of an hydraulic device 13 is pivotable round a horizontal shaft 14, and for another part a holding device 15 which is pivotable round a horizontal shaft 16 by means of a hydraulic device 17. In erect position the arm 12 extends with its point above the plane, which is shaped by the edges of the plates 1, 2, when said plates are in horizontal position. The holding device 15 is arranged to extend above said edges of the plates 1, 2 with a pressure surface 18. Also a shoulder 19 of the end frame pieces 5 is above said edges of the plates 1, 2 while the top edges of the end frame pieces for the rest are so downwards inclined that the intended overturning of a square billet 20 is not disturbed. For the holding together of the end frame pieces 5 as well as for their keeping in upright position, bottom plates 21 are provided for one part, and for another a bar 22. The bottom plates 21 also serve the purpose to provide a foundation for the fixed supports of the hydraulic devices 13, 17 and for the driving motor 11.

The overturning device illustrated is designed in addition to perform its turning function also to serve the purpose of a supporting table for the work piece 20, when this is subjected to machining, by means of a rotable and along the top surface of the work piece 20 displaceable grinding disc 23. During the machining operation it is intended to hold the work piece 20 clamped between the shoulder 19 and the pressure surface 18 of the arm 15, which is pressed against the work piece by pivoting of the arm by means of the hydraulic device 17.

Figure 3:
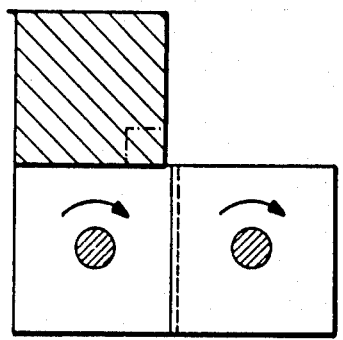
Figure 4:
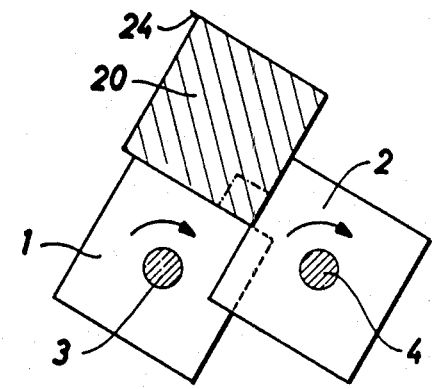
Figure 5:
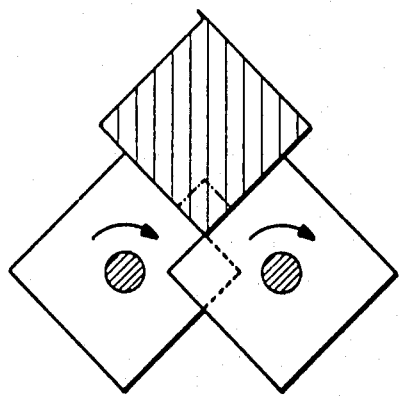
Figure 6:
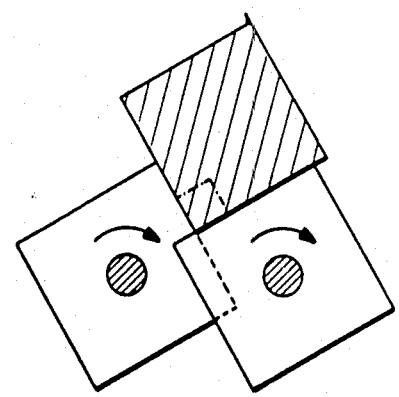

The way the overturning device is functioning is evident from FIGS. 3 - 7. In these figures the plates 1, 2 with their shafts 3, 4 and the work piece 20 can be seen. In the starting position the plates 1, 2 have their upper edges in a common horizontal line and the work piece 20 is on the left plate 1, as is shown in FIG. 3. In FIG. 3 it is shown, how the two plates 1, 2 during the overturning operation are overturned in clockwise direction in a synchronized movement. The work piece 20 then by its weight will remain in the V-shaped notch shaped by the plates 1, 2 and will follow the turning movement of the plates as is shown in the sequence of FIGS. 4 - 6. As is evident from FIG. 7 the work piece finally will be on the right square plate 2, when the plates 1, 2 have been pivoted a quarter of a turn, the work piece 20 at the same time having been pivoted a quarter of a turn.

Figure 7:
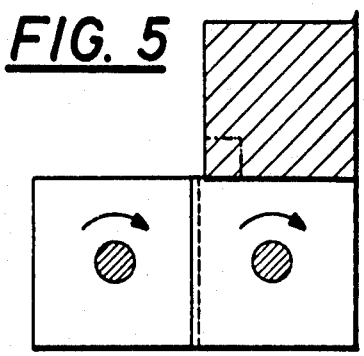

In the final position in FIG. 7 the work piece 20 thus is in the position shown in FIG. 1 and it can now be clamped in working position between the shoulder 19 and the pressure surface 18 of the arm 15 by actuation of the hydraulic device 17.

If it is assumed that the grinding disc 23 rotates in the direction indicated with an arrow, a grinding burr 24 is shaped in the upper left corner of the work piece (FIG. 3). As is evident from the FIGS. 3 - 7 the last shaped grinding burr in connection with the overturning operation after pivoting will be at the right edge of the surface, which shall be machined next, and thus it will be removed during the course of this machining. Therefore no special removal of burr need be carried out with the exception of at one corner. In order to permit that the turning shall be possible in succession with due consideration to the grinding burr, the work piece before each overturning thereof must be moved from the machining position (FIG. 1 and FIG. 7) to the starting position (FIG. 3). This can take place by means of the arms 12, which by actuation of the hydraulic device 13 can be pivoted to the left (FIG. 1), whereby the work piece 20 is displaced to the left plate 1 gliding on the coinciding upper edges of the two plates 1, 2.

In connection with the embodiment described it has been assumed that only a body of square cross section shall be turned. It should be clear that the size of the square side of the cross section can vary within wide limits for the body, which shall be overturned. This has also been hinted with dashed and dotted lines in FIGS. 3 - 7. It is also evident that other cross sections, which can be inscribed in a square, can occur in this connection. So for example a body with chamfered corners and even a body, the cross section of which is a regular octagon, can be overturned without difficulty. In addition it is possible by change of the shape of the plates and/or the relation between the pivoting angles to adapt the device for overturning of other types of prismatic bodies, by way of example such ones of hexagonal cross section.

I claim:

1. A device for the overturning of polygnol bodies comprising at least one pair of overturning elements with each element having a square cross section in a plane perpendicular to the center axis of said element, a pair of shafts extending in a common horizontal plane with each of said elements being journalled on a different one of said shafts with each shaft extending through said center axis of its respective overturning element, said overturning elements being positioned side by side when two edges of said elements are in the same plane and parallel to a plane through their center axis whereby said elements are displaced relative to each other so that they partly overlap each other when rotating, means for rotating said elements about said shafts in the same direction whereby polygnol bodies placed on said polygnol bodies will be overturned.

2. Device for the overturning of polygnol bodies as claimed in claim 1 including a plurality of said pairs of overturning elements with said pairs of elements being positioned one after the other along said shafts and said plurality of pairs of elements having a shorter longitudinal length than the body to be overturned.

3. Device for the overturning of polygnol bodies as claimed in claim 2 including driven means capable of displacing the body to be overturned along the upward directed edges of said overturning elements for bringing the body to a starting position for being overturned.

4. Device for the overturning of polygnol bodies as claimed in claim 2 including a driven holding device capable of holding the polygnol body on upward turned edges of said overturning elements whereby work can be carried out on the polygnol body.

5. Device for the overturning of polygnol bodies as claimed in claim 1 wherein each of said overturning elements being a plate shaped element.

* * * * *